US009667546B2

(12) United States Patent
Morrison et al.

(10) Patent No.: US 9,667,546 B2
(45) Date of Patent: *May 30, 2017

(54) PROGRAMMABLE PARTITIONABLE COUNTER

(71) Applicant: MoSys Inc., Santa Clara, CA (US)

(72) Inventors: Michael Morrison, Sunnyvale, CA (US); Jay Patel, Los Gatos, CA (US); Man Kit Tang, Saratoga, CA (US)

(73) Assignee: MoSys, Inc., Santa Clara, CA (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/912,033

(22) Filed: Jun. 6, 2013

(65) Prior Publication Data

US 2013/0332708 A1 Dec. 12, 2013

Related U.S. Application Data

(60) Provisional application No. 61/656,377, filed on Jun. 6, 2012.

(51) Int. Cl.
*H04L 12/801* (2013.01)
*H04L 12/815* (2013.01)
*G06F 9/30* (2006.01)
*G06F 13/12* (2006.01)

(52) U.S. Cl.
CPC ............ *H04L 47/10* (2013.01); *G06F 9/3005* (2013.01); *G06F 13/128* (2013.01); *H04L 47/22* (2013.01)

(58) Field of Classification Search
CPC ......... H04L 47/10; H04L 47/22; H04L 47/00; H04L 47/20; H04L 47/21; H04L 47/215; G06F 9/3005
See application file for complete search history.

(56) References Cited

U.S. PATENT DOCUMENTS

| | | | |
|---|---|---|---|
| 5,003,390 A | 3/1991 | Helgert et al. | |
| 5,410,721 A * | 4/1995 | Divine et al. | 712/245 |
| 6,101,591 A * | 8/2000 | Foster et al. | 711/219 |
| 6,192,466 B1 * | 2/2001 | Gschwind | 712/214 |
| 6,310,599 B1 * | 10/2001 | Bril | G09G 3/36 345/211 |
| 6,799,262 B1 * | 9/2004 | Blandy et al. | 712/200 |
| 6,970,426 B1 | 11/2005 | Haddock | |
| 7,299,282 B2 | 11/2007 | Sarkissian et al. | |
| 7,385,985 B2 | 6/2008 | Narsinh et al. | |
| 7,538,772 B1 | 5/2009 | Fouladi et al. | |
| 7,539,489 B1 * | 5/2009 | Alexander | 455/423 |
| 7,698,412 B2 | 4/2010 | Narsinh et al. | |
| 7,724,814 B2 | 5/2010 | Simpson et al. | |
| 8,074,132 B2 | 12/2011 | Guettaf et al. | |
| 8,345,696 B2 * | 1/2013 | Kuramoto | H04L 47/10 370/401 |
| 8,360,871 B2 | 1/2013 | Sylla et al. | |
| 8,769,088 B2 | 7/2014 | Campbell et al. | |

(Continued)

*Primary Examiner* — Benjamin H Elliott, IV
(74) *Attorney, Agent, or Firm* — Wagner Blecher LLP

(57) ABSTRACT

An integrated circuit device for receiving packets. The integrated circuit device includes a programmable partitionable counter that includes a first counter partition for counting a number of the packets, and a second counter partition for counting bytes of the packets. The first counter partition and the second counter partition are configured to be incremented by a single command from the packet processor.

23 Claims, 10 Drawing Sheets

(56) References Cited

U.S. PATENT DOCUMENTS

| | | | |
|---|---|---|---|
| 2001/0015957 A1* | 8/2001 | Kawarai | H04L 12/5601 370/230 |
| 2002/0046324 A1* | 4/2002 | Barroso et al. | 711/122 |
| 2002/0056022 A1 | 5/2002 | Leung | |
| 2002/0191543 A1 | 12/2002 | Buskirk et al. | |
| 2004/0199630 A1 | 10/2004 | Sarkissian et al. | |
| 2005/0086458 A1* | 4/2005 | Cheng | G06F 17/5045 713/1 |
| 2005/0107986 A1* | 5/2005 | Jones | G06F 11/3466 702/186 |
| 2005/0141510 A1 | 6/2005 | Narsinh et al. | |
| 2005/0240745 A1* | 10/2005 | Iyer | G06F 12/0223 711/167 |
| 2006/0101152 A1* | 5/2006 | Yeh | H04L 41/142 709/231 |
| 2007/0079167 A1 | 4/2007 | Lemos | |
| 2007/0266370 A1 | 11/2007 | Myers et al. | |
| 2008/0043899 A1 | 2/2008 | Gara et al. | |
| 2008/0174329 A1* | 7/2008 | Papageorgiou | G01R 31/3025 324/762.01 |
| 2010/0107023 A1 | 4/2010 | Guettaf et al. | |
| 2010/0158023 A1* | 6/2010 | Mukhopadhyay | G06F 15/7825 370/401 |
| 2010/0205293 A1 | 8/2010 | Hu | |
| 2010/0222135 A1 | 9/2010 | Sylla et al. | |
| 2012/0239902 A1 | 9/2012 | Moran et al. | |
| 2013/0003555 A1 | 1/2013 | Moran et al. | |
| 2013/0086248 A1 | 4/2013 | Campbell et al. | |
| 2013/0222109 A1* | 8/2013 | Lim | G06F 11/006 340/5.8 |
| 2013/0329555 A1* | 12/2013 | Patel | H04L 47/10 370/232 |
| 2015/0019803 A1* | 1/2015 | Miller | G06F 3/0611 711/105 |

* cited by examiner

PROGRAMMABLE PARTITIONABLE COUNTER

CROSS-REFERENCE TO RELATED U.S. APPLICATIONS

This Application claims priority to and benefit of U.S. Patent Application No. 61/656,377, filed on Jun. 6, 2012, entitled, "MEMORY DEVICE WITH AN EMBEDDED LOGIC UNIT," by Tang et al., and assigned to the assignee of the present application.

This Application is related to U.S. patent application Ser. No. 14/503,382 filed on Sep. 30, 2014 entitled, "PARTITIONED MEMORY WITH SHARED MEMORY RESOURCES AND CONFIGURABLE FUNCTIONS" by Miller et al., and assigned to the assignee of the present application. This Application is also related to U.S. patent application Ser. No. 13/911,999 filed on Jun. 6, 2013 entitled "DUAL COUNTER" by Patel et al., and to U.S. patent application Ser. No. 13/838,971 filed on Mar. 15, 2013 entitled "TRAFFIC METERING AND SHAPING FOR NETWORK PACKETS" by Patel et al., both of which are assigned to the assignee of the present application.

BACKGROUND

In modern communication networks data is transferred using a formatted unit of data referred to as a packet. When data is formatted into packets, the bit rate of the communication medium is better shared among users than if the network were circuit switched. Packet processors have specific features or architectures that are provided to enhance and optimize packet processing within these networks.

DISCLOSURE

A memory device with an embedded logic unit is disclosed. In particular, a packet processing acceleration device, also referred to as a bandwidth engine that integrates high density memory, a high speed interface, and an arithmetic logic unit is disclosed. The bandwidth engine receives signals external to the bandwidth engine including one or more instructions. The bandwidth engine also comprises a programmable instruction memory, a programmable configuration memory, and in some embodiments a plurality of counters. Additionally, embodiments in accordance with the present invention can be described as follows:

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to in this description should be understood as not being drawn to scale. It should be noted that a break in a line in the drawings referred to in this description signifies that a line and the perpendicular line(s) crossing it do not connect.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, conventional methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "programming," "partitioning," "receiving," "performing," "adding," "merging," "correcting," "writing," or the like, refer to the actions and processes of a computer system or similar electronic computing device (or portion thereof) such as, but not limited to: an electronic control module, field programmable gate array (FPGA), application-specific integrated circuit (ASIC), and/or a management system (or portion thereof). The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Overview of Discussion

Example techniques, devices, systems, and methods for a memory system comprising a memory with an embedded logic unit are described herein. Discussion begins with a high level description of a memory system comprising a memory with an embedded logic unit, also known as a "bandwidth engine." Example methods of governing network traffic are then described, including metering, policing and shaping. Discussion continues with a description of the memory system performing a plurality of operations in response to a single command. A memory system that comprises a programmable partitionable counter is then described. Next, an example method of use is described. Lastly, an example computer environment is described.

Bandwidth Engine Overview

Figure 1:
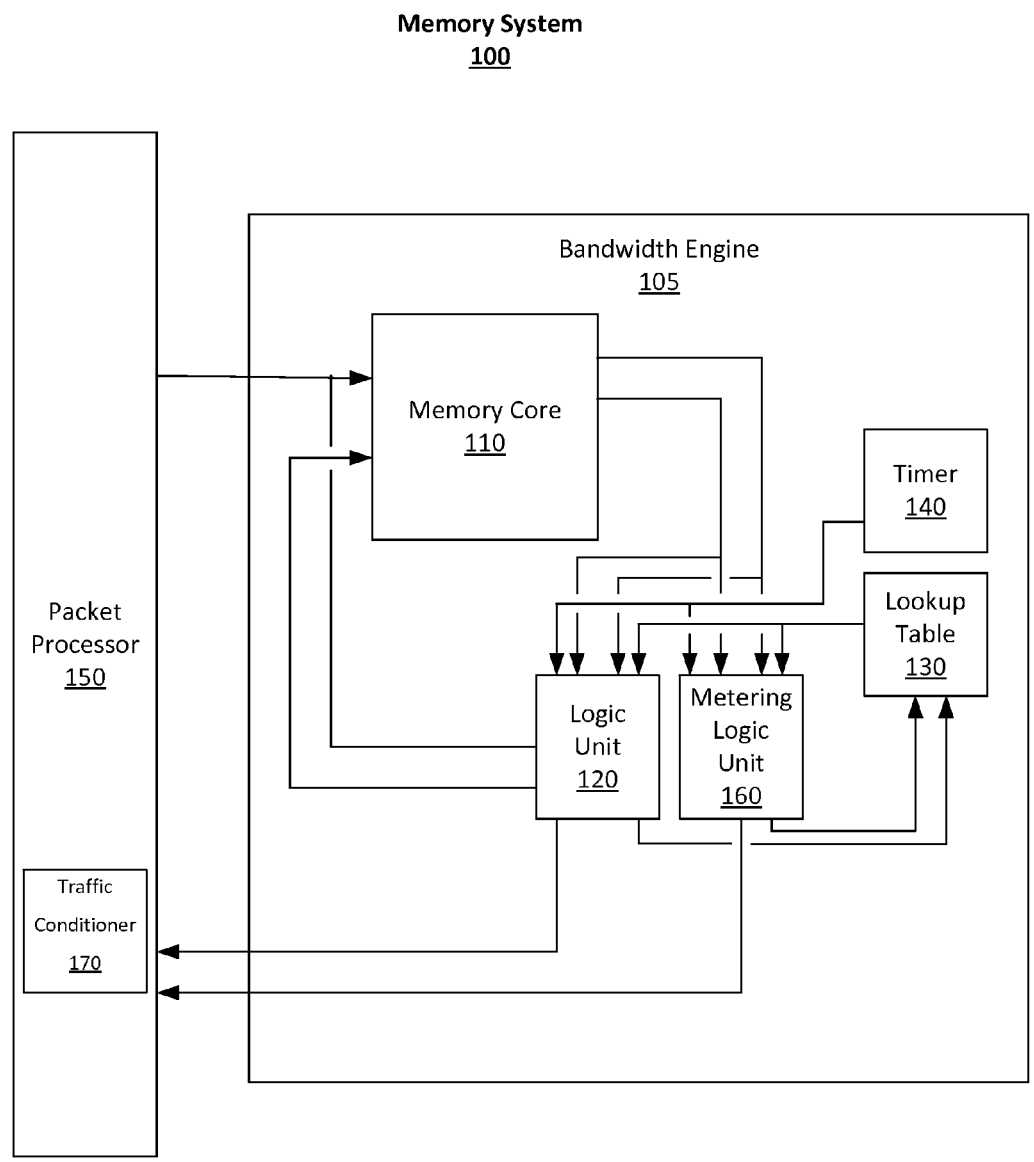
FIG. 1 is a diagram of an example of a memory system including a bandwidth engine, in accordance with various embodiments.

FIG. 1 shows a block diagram of a memory system 100 in accordance with one embodiment of the present invention. Memory system 100 comprises bandwidth engine 105 and is located on an integrated circuit chip. Bandwidth engine 105 comprises memory core 110 and logic unit 120. Bandwidth engine 105 may be used for data that is accessed often.

In various embodiments, bandwidth engine 105 is configured to receive packets from a second apparatus via a communication path. In some embodiments, the second apparatus is packet processor 150. Packet processor 150 may be any type of processor including, but not limited to: a central processing unit, a microprocessor, a graphics processing unit, a physics processing unit, a digital signal processor, a network processor, a front end processor, a coprocessor, a data processor, an audio processor, a multi core processor, an ASIC, a system-on-chip (SoC), a structured ASIC, an FPGA, etc.

Packet processor 150 is capable of performing commands on external memory. As an example, packet processor 150 may fetch data from a memory block, perform a command using the data received from the memory block, write back to the memory block, and then send a command which updates the memory block's internal counters.

Bandwidth engine 105 contains an internal arithmetic logic unit (ALU or logic unit) 120 such that when packet processor 150 attempts to perform an operation using data located in memory core 110, rather than sending the data directly from memory core 110 to packet processor 150 to perform a command, logic unit 120 can perform a command, update the internal counter of memory core 110, send data to memory core 110, and/or send data to packet processor 150. In some embodiments, memory core 110 may be partitioned memory. Logic unit 120 can access, modify and retire networking operations wholly within bandwidth engine 105. Logic unit 120 supports statistics, counters and other applications, and reduces the latency and bandwidth requirements for macro operations.

Latency is reduced with bandwidth engine 105 since a packet processor 150 does not need to send and receive as much data because of embedded logic unit 120 of bandwidth engine 105. Additionally, more bandwidth is available because bandwidth engine 105 does more work locally. In some embodiments, a plurality of commands may be performed within bandwidth engine 105 after bandwidth engine 105 receives a single command from packet processor 150. As a result, the amount of packet processing operations by packet processor 150 is reduced. In particular, packet processor 150 is not required to perform identical processing commands because it offloads some processing to bandwidth engine 105.

Figure 2:
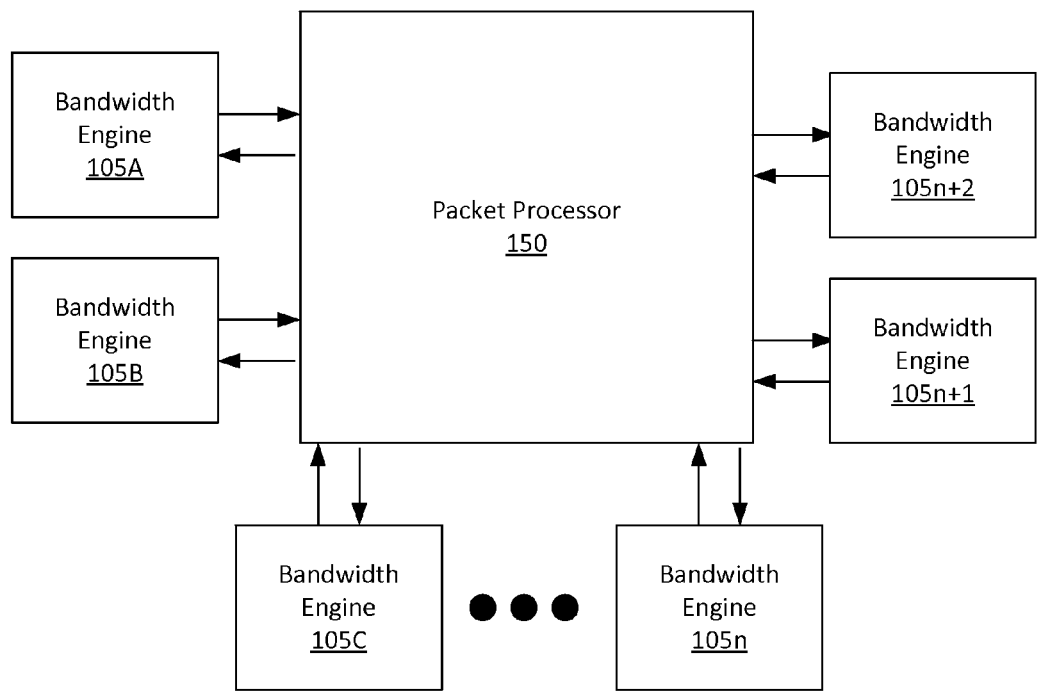
FIG. 2 is a diagram of an example packet processor coupled to a plurality of bandwidth engines, in accordance with various embodiments.

In various embodiments, memory core 110 may be serial or parallel accessed. In some embodiments, memory core 110 may comprise memory construction including, but not limited to: SRAM, DRAM, embedded DRAM, 1T-SRAM, Quad Data Rate SRAM, RLDRAM, or Flash as examples. Also, in some embodiments packet processor 150 may be coupled to a plurality of memory systems 100, as shown in FIG. 2. FIG. 2 shows a packet processor coupled to bandwidth engines 150A, 105B, 105C . . . 105n, 105n+1 and 105n+2.

In some embodiments, bandwidth engine 105 uses a serial interface using an open industry available serial protocol, which is optimized for chip-to-chip communications. Bandwidth engine 105 also provides an interface for serializer/deserializer (SerDes) technology (i.e., functional blocks that convert data between serial data and parallel data interfaces in each direction).

Bandwidth engine 105 includes timer 140 that sends a signal into logic unit 120 and metering logic unit 160. Bandwidth engine 105 can include a plurality of timers 140. Timers 140 can determine the amount of time that has passed since a particular event. For example, timers 140 may determine the amount of time that has passed since a record or information about a user/account was accessed.

Bandwidth engine 105 includes lookup table 130. In one embodiment, as traffic passes through logic unit 120 lookup table 130 provides logic unit 120 and/or metering logic unit 160 with actions that should be performed on the traffic. In one embodiment, when either logic unit 120 or metering logic unit 160 receives a packet, lookup table 130 may look up whether a bucket contains sufficient tokens and whether that traffic may be passed. The bandwidth engine then returns a metering result (e.g., whether that traffic may be passed) to the host ASIC/packet processor 150. In some embodiments, the lookup table 130 may be configured to carry out a plurality of procedures.

Metering logic unit 160, in some embodiments, runs in parallel with logic unit 120 and, as discussed below, meters and marks traffic to ensure compliance with a traffic contract. Note that in some embodiments, bandwidth engine 105 does not comprise a metering logic unit 160. In some embodiments, the logic unit 120 performs operations related to metering traffic, marking traffic, and sending signals to packet processor 150 or traffic conditioner 170.

Packet processor 150 includes traffic conditioner 170 that, as discussed below, shapes and drops packets in response to signals/recommendations received by metering logic unit 160 or logic unit 120. In some embodiments, packet processor 150 may disregard incoming data from bandwidth engine 105 that recommends whether packet processor 150 should send, delay or drop a packet.

Metering, Policing, and Shaping

Embodiments of the present invention provide for metering data packets. Metering is the process of governing network traffic for compliance with a traffic contract and taking steps to enforce that contract.

A traffic contract is similar to a service level agreement with a broadband network. In various embodiments, networks employ an asynchronous transfer mode (ATM). When a service or application wishes to use a broadband network to transport traffic, it must first inform the network about what kind of traffic is to be transported, and in some cases the performance requirements of the traffic. In some networks, regardless of the traffic contract, if bandwidth is available packets may be sent. In some networks, the time of day or the network congestion may be used to determine whether packets may be sent. In other words, the decision to send a packet may be based on the time of day or the congestion on a given network. A network may require an application wishing to send traffic over the network to indicate the type of service required, traffic parameters of the data flow in each direction, and/or the quality of service parameters requested in each direction. Services include, but are not limited to: the constant bit rate, the real-time variable bit rate, the non-real-time variable bit rate, the applicable bit rate and the unspecified bit rate.

When metering traffic, traffic that is in violation of a traffic contract may be dropped, marked as non-compliant, or left as-is depending on the policies of a network. Policing refers to dropping or disregarding traffic. "Coloring" refers to marking traffic as compliant, semi-compliant, or in violation/non-compliant. Also, shaping refers to rate limiting, or delaying traffic to bring packets into compliance with a traffic policy.

Figure 3:
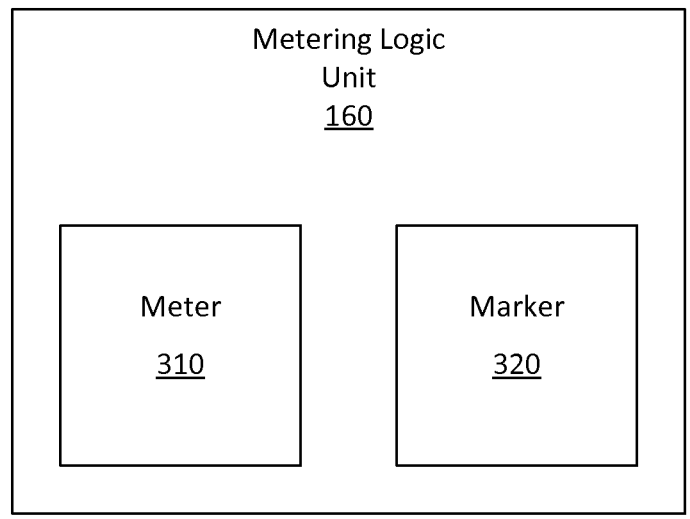
FIG. 3 is a block diagram of an example metering logic unit, in accordance with various embodiments.

FIG. 3 shows a metering logic unit 160.

Metering logic unit 160 comprises a meter 310 to determine whether the incoming traffic flow complies with a traffic contract. Meter 310 may determine whether a packet is compliant, semi-compliant, or in violation of a contract. As discussed above, in some embodiments there is no metering logic unit 160, in which case logic unit 120 performs the operations described herein as being performed by metering logic unit 160. In one embodiment, meter 310 determines the status of a packet based on its "color." It should be understood by those skilled in the art that a color comprises at least one bit comprising a particular value. As an example, a packet may be marked as green, yellow or red. Green typically indicates that a packet is compliant. In one embodiment, green may indicate that a packet does not exceed a committed burst size. Yellow typically indicates that a packet is not compliant, but is not in violation of the traffic contract. In one embodiment, yellow indicates that a packet exceeds the committed burst size, but does not exceed an excess burst size. Red typically indicates that the packet is in violation of the traffic contract. In some embodiments, metering logic unit 160 further comprises marker 320 that can mark, or re-mark, a packet based on information provided by the meter 310. In some embodiments, the marker 320 changes the color of a packet from one color to a different color.

Figure 4:
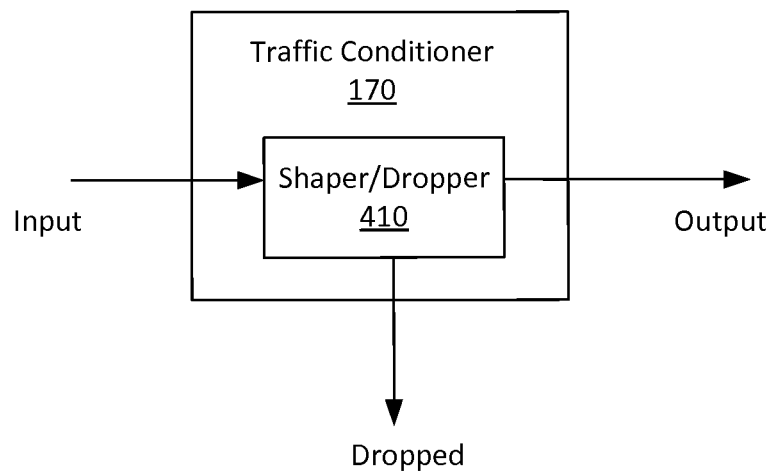
FIG. 4 is a block diagram of an example traffic conditioner, in accordance with various embodiments.

In some embodiments, packet processor 150 comprises traffic conditioner 170 that comprises a shaper/dropper 410 as shown in FIG. 4. Shaper/dropper 410 ensures the traffic sent by packet processor 150 complies with the traffic contract. In some cases, compliance may be enforced by policing (dropping packets). In some embodiments, a token bucket is used. In some embodiments, metered packets are stored in a FIFO buffer/queue until they can be transmitted in compliance with the traffic contract. It should be understood that policing and shaping may occur concurrently. Also, as discussed above, in some embodiments after packet processor 150/traffic conditioner 170 receives a recommendation regarding whether to send, delay, or drop a packet, packet processor 150/traffic conditioner 170 may disregard the recommendation and either send, delay or drop a packet regardless of the data sent by metering logic unit 160 or logic unit 120.

In some embodiments, metering is performed using at least one token bucket. When metering logic unit 160 is determining whether a packet is in compliance with a traffic contract, it will determine whether a bucket contains sufficient tokens to send the packet. Bucket tokens may be credited or debited. If a bucket contains a sufficient number of tokens such that a packet is in compliance, the appropriate number of tokens (which may be equivalent to the length of a packet in bytes) are removed, or debited/charged, from the token bucket and the packet is sent. In one embodiment, the packet is colored based on whether sufficient tokens are available. In another embodiment, if there are insufficient tokens in a bucket or buckets (e.g., main bucket, sister bucket, etc.) the packet is not in compliance and the contents of the bucket are not charged. Non-compliant packets may be dropped, queued for subsequent transmission when sufficient tokens have accumulated in a bucket, or transmitted after it is marked as in violation/non-compliant. If a packet is marked as in violation, it may be dropped if the network is subsequently overloaded. It should be understood that a leaky bucket may be employed in some embodiments. In general, a leaky bucket is used to check that data transmissions, in the form of packets, conform to defined limits on bandwidth and burstiness (a measure of the unevenness or variations in the traffic flow).

Figure 5:
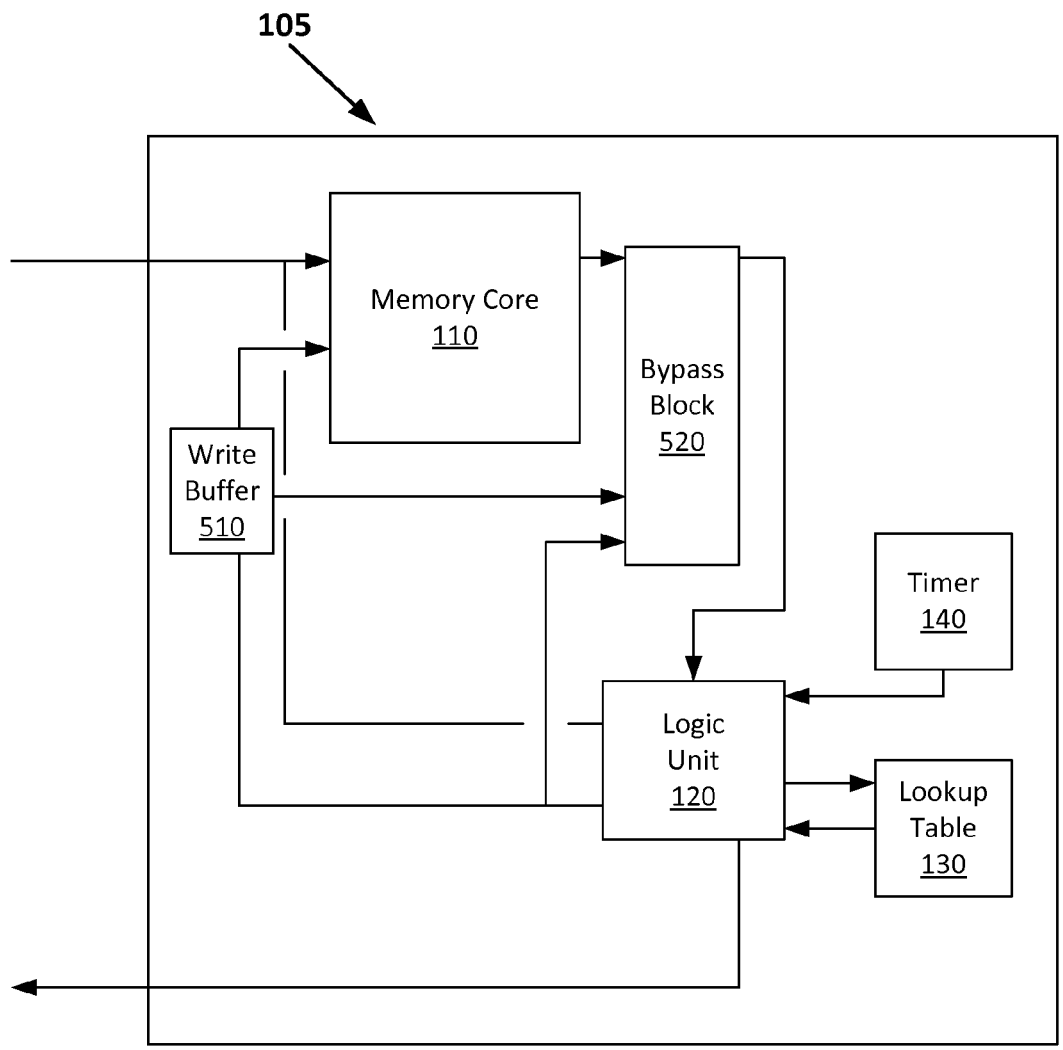
FIG. 5 is a block diagram of an example bandwidth engine, in accordance with various embodiments.

FIG. 5 shows a bandwidth engine 105, in accordance with one embodiment. Bandwidth engine 105 may comprise a write buffer 510 coupled to memory core 110 and bypass block 520. The write buffer 510 comprises data to be written to the memory. If an address (sometimes referred to as a user identification (UID)) is received by memory core 110 while write buffer 510 has data waiting to be written to the same address/UID, the write buffer sends the data waiting to be written to the bypass block 520.

Performing a Plurality of Operations in Response to a Single Command

Figure 6:
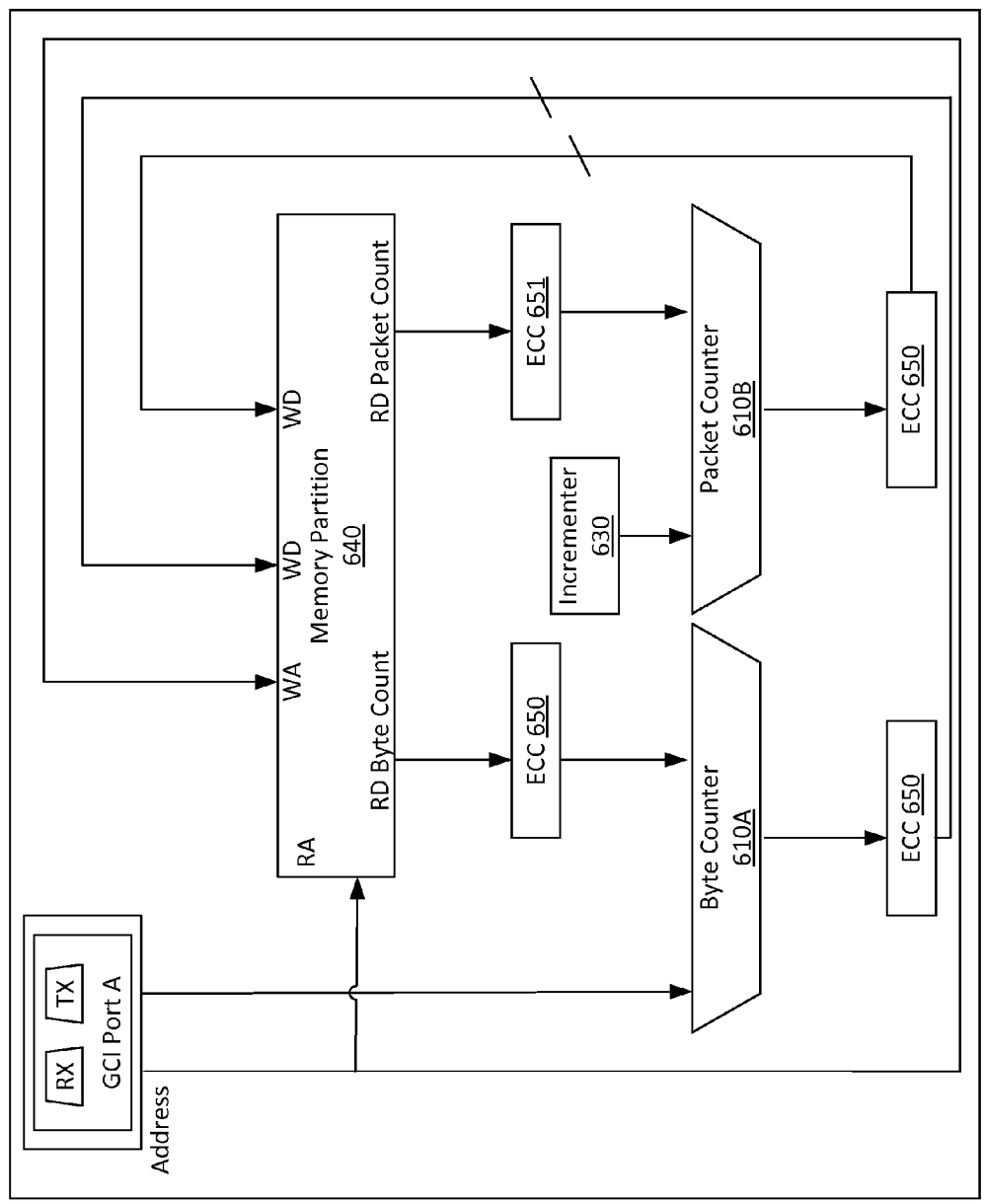
FIG. 6 is a block diagram of an example bandwidth engine, in accordance with various embodiments.
Figure 8:
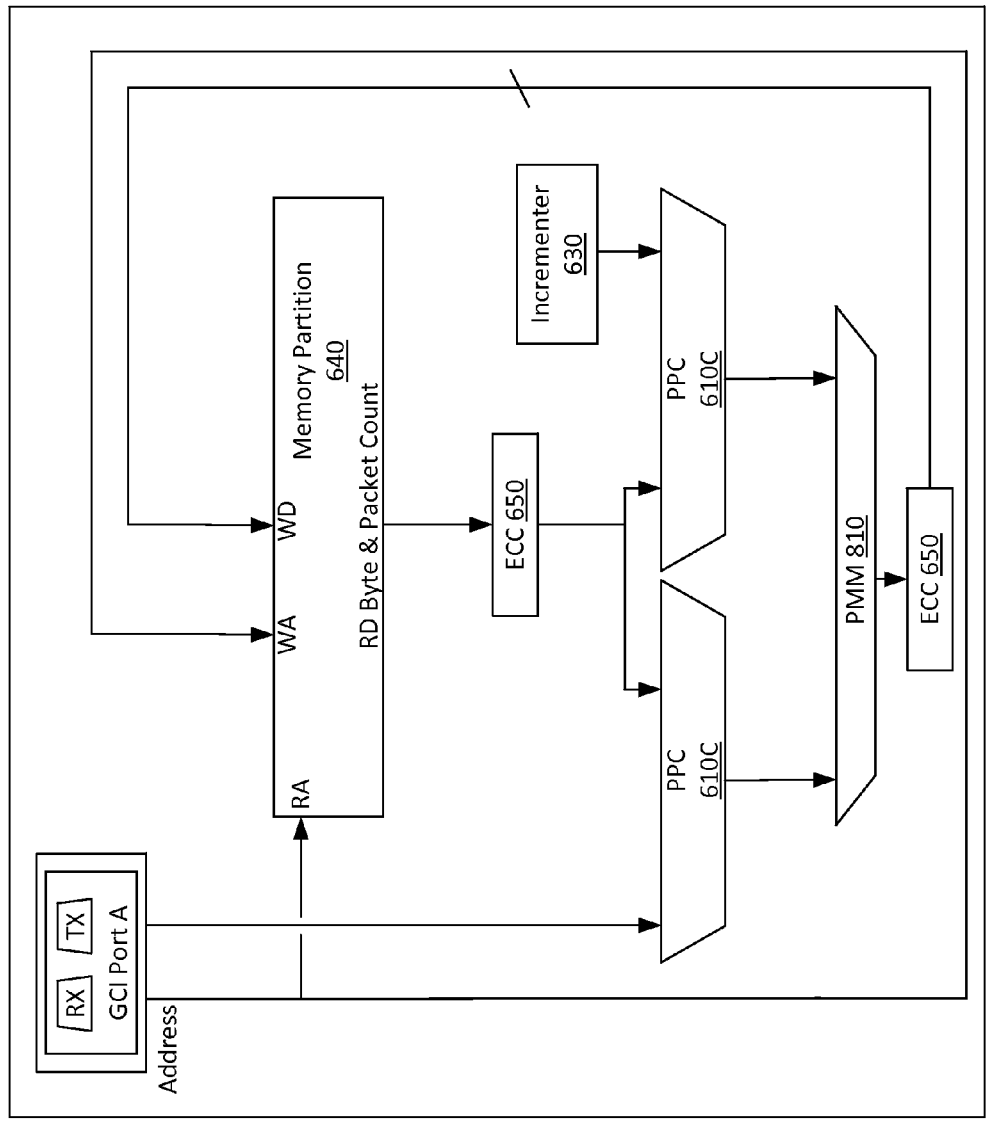
FIG. 8 is a block diagram of an example bandwidth engine, in accordance with various embodiments.

FIGS. 6 and 8 depict embodiments of a bandwidth engine. In some embodiments, when a packet is received memory core 110, statistics are updated. Statistics may comprise a number of bytes received and/or a number of packets received. A packet, received at packet processor 150, may contain statistics such as, but not limited to, a size, an address (or user identification), and a command. When a packet is received at packet processor 150, a command is sent to bandwidth engine 105 which contains a counter address and byte count value. The bandwidth engine 105 reads from the memory core 110 the contents of the counters (e.g., byte and packet) at the address. The counters are then incremented accordingly. For example, packet counter is incremented by 1 and byte counter is incremented by the number of bytes of the packet.

A packet counter 610B comprises the number of packets received by a memory core 110. A byte counter 610A comprises the number of bytes received by a memory core 110. In one embodiment, packet counters are comprised of life time counters, which store enough data such that the counter will continue to operate for the lifetime of the chip (e.g., 64b, 128b, etc.). In other words, a lifetime counter will not overflow during the lifetime of the system in which it is embedded. In some embodiments, counters smaller than lifetime counters include, but are not limited to: 32 bits, 64 bits, etc. For example, counter 610B may be designed to be reset monthly, yearly, etc. In some embodiments, a counter (byte counter 610A, packet counter 610B or both) is unique to a user, an account, a group of users, etc.

A packet received by packet processor 150 may be any size, for example the packets may be variable sizes. The commands send to the bandwidth engine, from the packet processor, may comprise 72 bits, wherein the command comprises 64 bits of data and 8 bits of error correcting code. In one embodiment, at least one error correcting code module (e.g., error correcting code module 650 and error correcting code module 651) is comprised in memory core 110. Also, counters 610 are embedded in a memory chip. In one embodiment, counters 610 are remote from a memory chip.

In various embodiments, statistics (e.g., the value of packet counters 610B) are sent back to packet processor 150 every time they change. Statistics may be sent to packet processor 150 at predetermined intervals (e.g., every n times, once a day, once a month, etc.). In one embodiment, statistics are not sent to packet processor 150.

In various embodiments, after memory core 110 receives a packet with one command, a plurality of functions are performed by logic unit 120. This is sometimes referred to as a dual operations or dual updating. For example, if one piece of information is received such as packet size, then the byte counter 610A and the packet counter 610B may be changed. In other words, the packet counter 610B is changed based on the receipt of a packet size which is used in updating byte counter 610A. It should be noted that in some embodiments byte counter 610A and packet counter 610B may refer to byte counter partition 710 and packet counter partition 720 respectively (both of FIG. 7).

As an example, when the command PDADD (Paired Double Word Add) is received as a command, the statistics are modified. For example, the operations P_COUNT=P_COUNT+1 and BYTE_COUNT=BYTE_COUNT+PACKET_SIZE are performed by logic unit 120 when a packet is received by memory core 110. Note that the size of a word can be any size including, but not limited to: 64 bits, 128 bits, etc.

Incrementer 630 may increment the packet counter 610B. It should be understood that incrementer 630 is a characterization of an action performed by logic unit 120. In one embodiment, incrementer 630 increments the packet counter by one. In various embodiments, incrementer 630 increments the packet counter by: a static number greater than one, a programmable number greater than one, a number of bits based on other parameters or statistics including packet size, or a negative number of bits. In one embodiment, counters may be incremented once every memory clock cycle. Counters may be incremented every system clock cycle. Counters may be incremented sequentially or simultaneously.

In various embodiments, to increment two lifetime counters (e.g., byte and packet) two reads and two writes are performed on 72b words (e.g., 64b+8b ECC) for a total of four commands and 4×72b data transferred between the processor and bandwidth engine. In particular contrast, this disclosed method transfers a single 72b command from the processor to the bandwidth engine. This disclosed method can improve bandwidth multiple times, as compared to conventional systems. It is noted that memory bandwidth bottlenecks between processors and memory may be limiting of producing 400 Gbps and 1 Tbps network packet processors. Also, statistics can be as much as 25 to 30% of a memory chip's bandwidth.

Programmable Partitionable Counter

Figure 7:
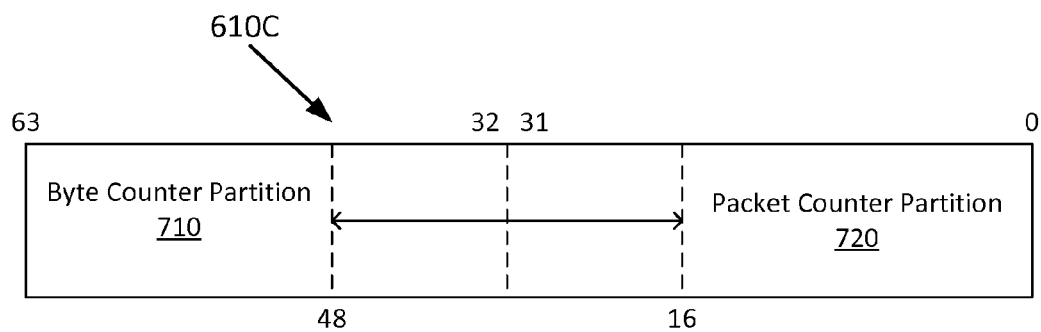
FIG. 7 is a diagram of an example programmable partitionable counter, according to various embodiments.

Counters (e.g., byte counter 610A and packet counter 610B) may be partitioned. In other words it may be split into multiple partitions once, twice, three times, four times, or more. For example, counter 610C may be split into a byte counter partition 710 and a packet counter partition 720. FIG. 7 shows a programmable partitionable counter 610C comprising 64 bits. A user may program a partition to separate counter 610C into byte counter partition 710 and packet counter partition 720 at any position he or she chooses. For example, a user may want to partition the programmable partitionable counter 610C such that the packet counter partition 720 comprises 16 bits while the byte counter partition comprises 48 bits. FIG. 7 shows dashed lines indicating example partitions that occur between bits 15 and 16, 31 and 32, and 47 and 48. It should be noted that a partition may be smaller than 16 bits.

In one embodiment, the type of account or network contract a user has determines the size and number of partitions comprised in programmable partitionable counter 610C. Partitions may be any size, and may be variable. In some embodiments, programmable partitionable counter 610C may be programmed to split into partitions as small as 1 bit. The counters may be a fixed size so the size of a partition value will not be small, such as ATM, packets. Programmable partitionable counter 610C may be programmed with four partitions of size s (e.g., s0, s1, s2 and s3) prior to system operation or implementation. In some embodiments, the s value is not stored in bandwidth engine 105, and instead stored in slower memory. In one embodiment, each user/account comprises only one associated s value. An s value is associated with a system as opposed to a user/account. Programming entry commands e (e.g., e0, e1, e2 and e3) correspond with the s sizes. In some embodiments, an entry (e) may be used for a particular user/account that corresponds to an s value. In one example, if an e value is entered that corresponds to an s value of −16 in a 64 bit counter, the packet counter partition 710 will comprise (32+(−16)) bits, while the byte counter partition 720 will comprise (32+(16)) bits. Note that programmable partitionable counter 610C may be partitioned into partitions as small as one bit (e.g., packet counter partition 720 may comprise 4 bits, while byte counter partition 710 comprises 60 bits). It should be understood, that in one embodiment, the sum of the bits in the partitions is 64. That is, for example, one partition includes 12 bits and another partition includes 52 bits for a total of 64 bits. Accordingly, the partitions can slide back forth to any desired granularity or setting. In one embodiment, one account/user may have a different s than another account/user. In other embodiments, an entry may be for multiple users or partitions. Multiple users may be grouped together based on the tasks they perform.

A counter may saturate when it reaches its maximum value. When a counter reaches its maximum value, in one embodiment, a user/account may receive a message indicating that the counter 610 is saturated and the memory core 110 cannot receive additional packets. The user/account may receive a message indicating that if additional money is paid, memory core 110 will continue to function. In one embodiment, after a counter reaches its maximum value it returns to zero.

In an embodiment, an address (sometimes referred to as a user identification (UID)) for a user/account is received so memory core 110 finds the location in the memory of the packet counter 610B and the byte counter 610A. By using an offset the memory core 110 may find additional information associated with a user/account. For instance while an address may point to one location in the memory core 110, the address in addition to the offset will point to another location in the memory core 110 where additional information is stored (e.g., information related to metering).

In one embodiment, the programmable partitionable counter 610C may consolidate four operations into one because operations are often paired, or in other words they are often performed at the same time. In an embodiment, the byte count is read, then the byte count is written, and the packet count may be read, and then the packet count is written. In one embodiment, an address comes in for a record, or a paired counter. In an embodiment, an address comes in, and a double word which is 144 bits is modified based on the address and the offset and stored in memory core 110.

In various embodiments, after data is sent to the logic unit 120 and before the resulting data is sent back to an address in memory core 110, another command is received by memory core 110 attempting to access the data at the address where the resulting data is intended to be written. At that point, the data at that address in memory core 110 is considered to be stale.

Example Methods of Operation

Figure 9:
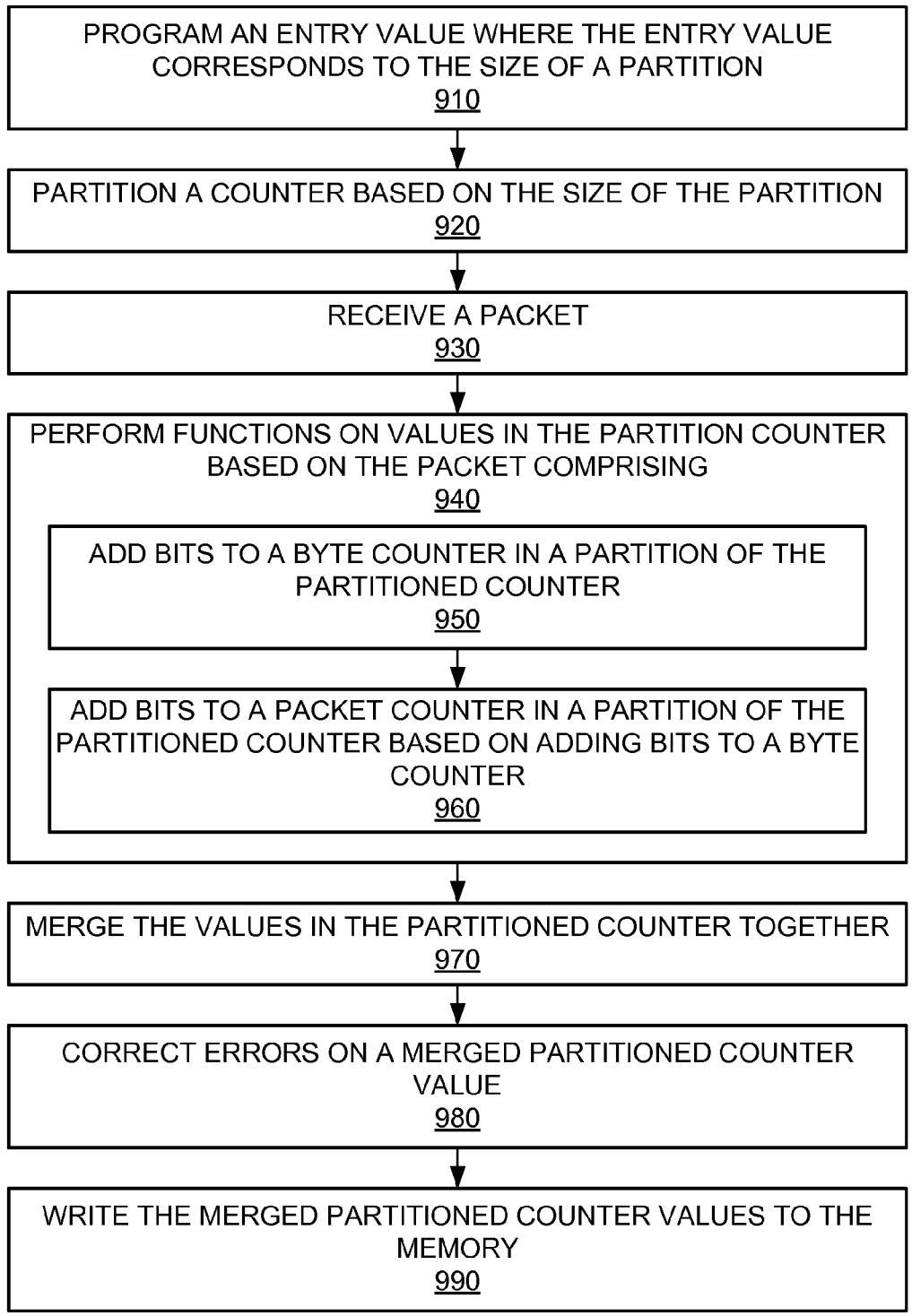
FIG. 9 illustrates a flow diagram of an example method of partitioning and incrementing a counter in a memory, in accordance with various embodiments.

With reference to FIG. 9, flow diagram 900 illustrates example procedures used by various embodiments. Flow diagram 900 includes processes and operations that, in various embodiments, are carried out by one or more of the devices illustrated in FIGS. 1-8 or via computer system 1000 or components thereof.

Although specific procedures are disclosed in flow diagram 900, such procedures are examples. That is, embodiments are well suited to performing various other operations or variations of the operations recited in the processes of flow diagram 900. Likewise, in some embodiments, the operations in flow diagram 900 may be performed in an order different than presented, not all of the operations described in one or more of these flow diagrams may be performed, and/or one or more additional operation may be added.

The following discussion sets forth in detail the operation of some example methods of operation of embodiments. With reference to FIG. 9, flow diagram 900 illustrates example procedures used by various embodiments. Flow diagram 900 includes some procedures that, in various embodiments, are carried out by a processor under the control of computer-readable and computer-executable instructions. In this fashion, procedures described herein and in conjunction with flow diagram 900 are or may be implemented using a computer (e.g., computer system 1000), in various embodiments. The computer-readable and computer-executable instructions can reside in any tangible computer readable storage media, such as, for example, in data storage features such as RAM (e.g., SRAM, DRAM, Flash, embedded DRAM, EPROM, EEPROM, etc.), ROM, and/or storage device. The computer-readable and computer-executable instructions, which reside on tangible computer readable storage media, are used to control or operate in conjunction with, for example, one or some combination of processor, or other similar processor(s). Although specific procedures are disclosed in flow diagram 900, such procedures are examples. That is, embodiments are well suited to performing various other procedures or variations of the procedures recited in flow diagram 900. Likewise, in some embodiments, the procedures in flow diagram 900 may be performed in an order different than presented and/or not all of the procedures described in one or more procedures described in FIG. 9 may be performed. It is further appreciated that one or more procedures described in flow diagram 900 may be implemented in hardware, or a combination of hardware and firmware, or a combination of hardware and software running thereon.

FIG. 9 is a flow diagram 900 of an example method of partitioning and incrementing a counter in a memory, in accordance with an embodiment. Reference will be made to elements of FIGS. 1, 6, 7 and 8 to facilitate the explanation of the operations of the method of flow diagram 900. In one embodiment, the method of flow diagram 900 describes the use of programmable partitionable counters 610C and a bandwidth engine 105 that performs a plurality of operations based on one command.

At 910, in one embodiment, an entry value is programmed wherein the entry value corresponds with the size of a partition. An entry value, (e.g., e0, e1, e2 or e3) is programmed and corresponds with the size of a partition (e.g., s0, s1, s2 or s3).

At 920, in one embodiment, a counter 610C is partitioned based on the size (s value) of the partition. In one embodiment, the entries must be programmed in an order such that if the first entry corresponds with the first partition of bits of a counter, the second entry corresponds with the next partition of bits in the counter, and so on.

At 930, in one embodiment, the memory receives a packet. In various embodiments, memory core 110 can receive a packet sent from either the logic unit 120, the write buffer 510, or the packet processor 150.

At 940, in one embodiment, functions are performed on the values in the partition counter 610C based on the packet comprising operations 950 and 960. In one embodiment, logic unit 120 updates the statistics (e.g., values in the counters).

At 950, in one embodiment, a bit/bits are added to a byte counter partition 710 in a partition of the partitioned counter 610C. As discussed herein, a packet typically contains the packet size. The packet size is added to the byte counter partition 710 within programmable partitionable counter 610C in some embodiments. In some embodiments, the packet size is added to a byte counter 610A.

At 960, in one embodiment, bits are added to a packet counter partition 720 in the partitioned counter 610C based on adding bits to a byte counter partition 710. As discussed herein, a dual operation may occur where instead of sending two commands to add to both byte counter partition 710 and packet counter partition 720, a dual operation adds to the packet counter partition 720 whenever the byte counter partition 710 changes. As discussed herein, the packet counter partition 720 may be incremented by 1, more than 1, or a number based on the packet.

At 970, in one embodiment, the values in the partitioned counter are merged together. In some embodiments, programmable merge module 810 gathers values from a plurality of counters and sends them to memory partition 640.

At 980, in one embodiment, errors are corrected on a merged partitioned counter value. This operation occurs at error correction code modules 650. Note that error correcting may occur elsewhere in the bandwidth engine. For example, error correcting may occur at various times/places including, but not limited to: after data is read from the memory core 110, when bandwidth engine 105 receives a packet, before bandwidth engine 105 sends a packet, before an operation is performed on data in the logic unit 120 or metering logic unit 160, after an operation is performed on data in the logic unit 120 or metering logic unit 160, before data enters memory core 110, etc.

At 990, in one embodiment, the merged partitioned counter values are written to the memory partition 640. In some embodiments, the values may be sent to packet processor 150.

Example Computer System Environment

Figure 10:
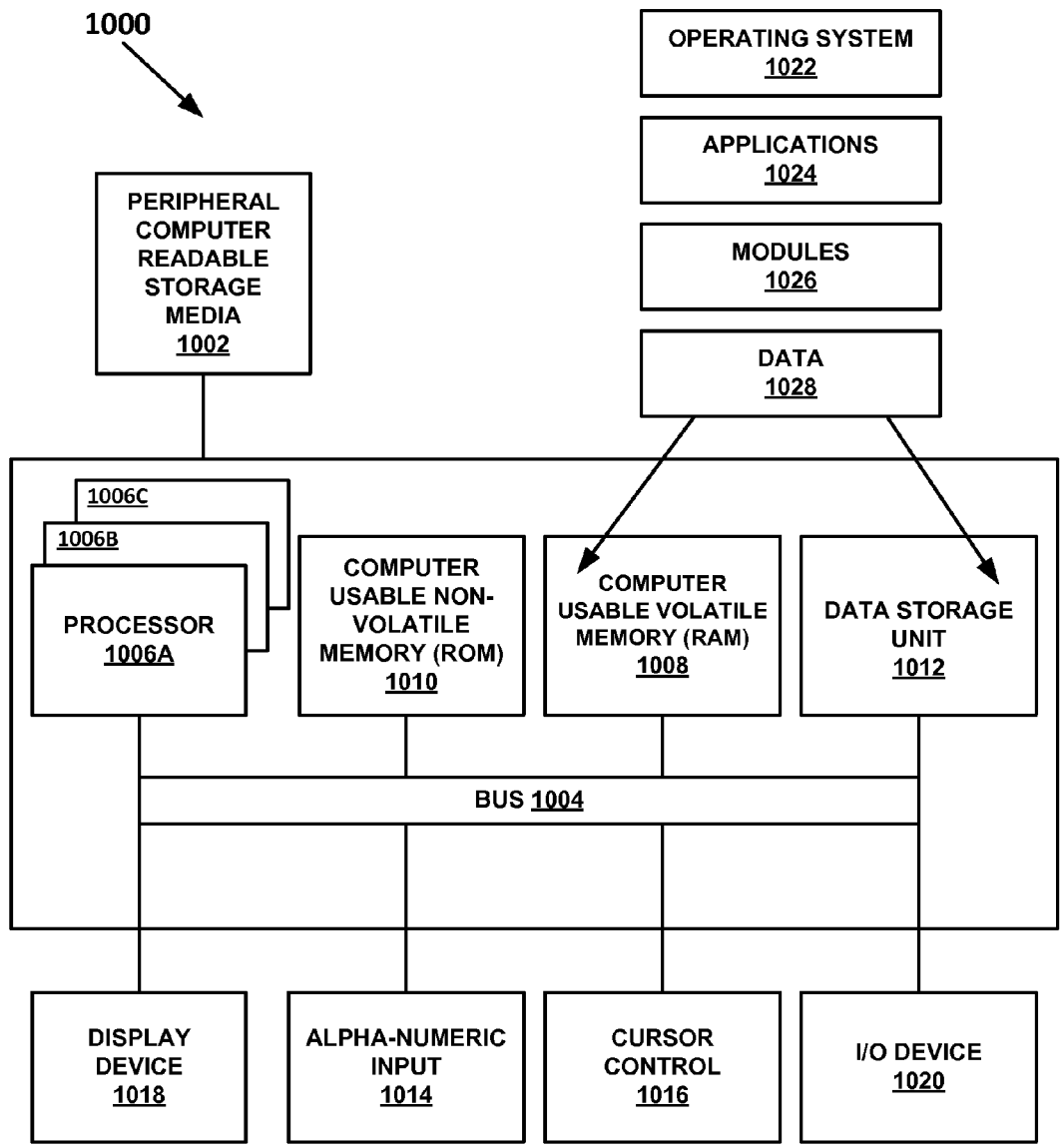
FIG. 10 is a block diagram of a system used in accordance one embodiment.

With reference now to FIG. 10, all or portions of some embodiments described herein are composed of computer-readable and computer-executable instructions that reside, for example, in computer-usable/computer-readable storage media of a computer system. That is, FIG. 10 illustrates one example of a type of computer (computer system 1000) that can be used in accordance with or to implement various embodiments which are discussed herein. It is appreciated that computer system 1000 of FIG. 10 is an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, and the like. Computer system 1000 of FIG. 10 is well adapted to having peripheral tangible computer-readable storage media 1002 such as, for example, a floppy disk, a compact disc, digital versatile disc, other disc based storage, universal serial bus "thumb" drive, removable memory card, and the like coupled thereto. The tangible computer-readable storage media is non-transitory in nature.

System 1000 of FIG. 10 includes an address/data bus 1004 for communicating information, and a processor 1006A coupled with bus 1004 for processing information and instructions. As depicted in FIG. 10, system 1000 is also well suited to a multi-processor environment in which a plurality of processors 1006A, 1006B, and 1006C are present. Conversely, system 1000 is also well suited to having a single processor such as, for example, processor 1006A. Processors 1006A, 1006B, and 1006C may be any of various types of microprocessors. System 1000 also includes data storage features such as a computer usable volatile memory 1008, e.g., random access memory (RAM), coupled with bus 1004 for storing information and instructions for processors 1006A, 1006B, and 1006C. System 1000 also includes computer usable non-volatile memory 1010, e.g., read only memory (ROM), coupled with bus 1004 for storing static information and instructions for processors 1006A, 1006B, and 1006C. Also present in system 1000 is a data storage unit 1012 (e.g., a magnetic or optical disk and disk drive) coupled with bus 1004 for storing information and instructions. System 1000 may also include an alphanumeric input device 1014 including alphanumeric and function keys coupled with bus 1004 for communicating information and command selections to processor 1006A or processors 1006A, 1006B, and 1006C. System 1000 may also include cursor control device 1016 coupled with bus 1004 for communicating user input information and command selections to processor 1006A or processors 1006A, 1006B, and 1006C. In one embodiment, system 1000 may also include display device 1018 coupled with bus 1004 for displaying information.

Referring still to FIG. 10, display device 1018 of FIG. 10, when included, may be a liquid crystal device, cathode ray tube, plasma display device or other display device suitable for creating graphic images and alphanumeric characters recognizable to a user. Cursor control device 1016, when included, allows the computer user to dynamically signal the movement of a visible symbol (cursor) on a display screen of display device 1018 and indicate user selections of selectable items displayed on display device 1018. Many implementations of cursor control device 1016 are known in the art including a trackball, mouse, touch pad, joystick or special keys on alphanumeric input device 1014 capable of signaling movement of a given direction or manner of displacement. Alternatively, it will be appreciated that a cursor can be directed and/or activated via input from alphanumeric input device 1014 using special keys and key sequence commands. System 1000 is also well suited to having a cursor directed by other means such as, for example, voice commands. System 1000 also includes an I/O device 1020 for coupling system 1000 with external entities. For example, in one embodiment, I/O device 1020 is a modem for enabling wired or wireless communications between system 1000 and an external network such as, but not limited to, the Internet. In another example I/O device 1020 uses SerDes technology.

Referring still to FIG. 10, various other components are depicted for system 1000. Specifically, when present, an operating system 1022, applications 1024, modules 1026, and data 1028 are shown as typically residing in one or some combination of computer usable volatile memory 1008 (e.g., RAM), computer usable non-volatile memory 1010 (e.g., ROM), and data storage unit 1012. In some embodiments, all or portions of various embodiments described herein are stored, for example, as an application 1024 and/or module 1026 in memory locations within RAM 1008, computer-readable storage media within data storage unit 1012, peripheral computer-readable storage media 1002, and/or other tangible computer-readable storage media.

The invention claimed is:

1. An integrated circuit device for receiving packets comprising:
   a programmable partitionable counter comprising:
      a first sub-counter having a width, the first sub-counter for counting a number of said packets; and
      a second sub-counter having a width, the second sub-counter for counting bytes of said packets; and
   wherein:
      said first sub-counter and said second sub-counter are configured to be incremented by a single command from said packet processor;
      the programmable partitionable counter is configured to receive a partition offset size;
      the partition offset size varies a first sub-counter size by adding the partition offset size to a nominal partition width; and
      the partition offset size varies a second sub-counter size by subtracting the partition offset size from a nominal partition width.

2. The integrated circuit of claim 1, wherein said the integrated circuit is a system-on-chip (SoC).

3. The integrated circuit of claim 1, further comprising:
   a logic unit configured as said programmable partitionable counter.

4. The integrated circuit of claim 3, wherein said logic unit further comprises:
   an error correcting code (ECC) module.

5. The integrated circuit of claim 1, wherein a sum of the first sub-counter width and said second sub-counter width is a fixed quantity of bits.

6. The integrated circuit of claim 1, wherein:
   the width of the first sub-counter and the width of the second sub-counter both have a fixed size.

7. The integrated circuit of claim 1, wherein:
   the programmable partition counter is configured to perform a dual updating operation; and
   the dual updating operation increments the first sub-counter for packets based on a receipt of a packet size of bytes used to update the second sub-counter.

8. The integrated circuit of claim 1, further comprising:
   an incrementer for incrementing said first counter; wherein
   the incrementer is configured to increment the first sub-counter a programmable quantity of bits.

9. An integrated circuit device for receiving packets comprising:
   a programmable partitionable counter comprising:
      a first sub-counter having a width, the first sub-counter for counting a number of said packets; and
      a second sub-counter, having a width, the second sub-counter for counting bytes of said packets, wherein said first sub-counter and said second sub-counter are configured to be incremented by a single command from said packet processor; and wherein
      a size of said first sub-counter width and said second sub-counter width are configured to be programmably changed; and
      the width of the partitions is stored on the IC;
      the programmable partitionable counter is configured to receive a partition offset size;

the partition offset size varies a first sub-counter size by adding the partition offset size to a nominal partition width; and the partition offset size varies a second sub-counter size by subtracting the partition offset size from a nominal partition width.

10. The integrated circuit of claim 9, wherein said at least said first sub-counter does not receive any of said packets when said first sub-counter reaches its maximum value.

11. An integrated circuit device for receiving packets comprising:
a programmable partitionable counter comprising:
a first sub-counter having a partition, the first sub-counter for counting a number of said packets; and
a second sub-counter, having a partition, the second sub-counter for counting bytes of said packets, wherein said first sub-counter and said second sub-counter are configured to be incremented by a single command from said packet processor; and wherein
an entry value for said second sub-counter partition corresponds with an entry value for said first sub-counter partition,
the programmable partitionable counter is configured to receive a partition offset size;
the partition offset size varies a first sub-counter size by adding the partition offset size to a nominal partition width; and
the partition offset size varies a second sub-counter size by subtracting the partition offset size from a nominal partition width.

12. A data traffic governing system comprising:
a packet processor; and
an integrated circuit device comprising:
a programmable partitionable counter comprising:
a first sub-counter having a partition, the first sub-counter for counting a number of said packets; and
a second sub-counter having a partition, the second sub-counter for counting bytes of said packets, wherein said first sub-counter and said second sub-counter are configured to be incremented by a single command from said packet processor;
the programmable partitionable counter is configured to receive a partition offset size;
the partition offset size varies a first sub-counter size by adding the partition offset size to a nominal partition width; and
the partition offset size varies a second sub-counter size by subtracting the partition offset size from a nominal partition width.

13. The data traffic governing system of claim 12, wherein said logic unit further comprises:
an error correction code module.

14. The data traffic governing system of claim 12 wherein at least one of said first sub-counter partition and said second sub-counter partition is 64 bits wide.

15. An integrated circuit device for receiving packets comprising:
a programmable partitionable counter wherein:
the counter is configured to be split into a plurality of partitioned sub-counters of two or greater;
a width of at least two of the sub-counters is configured to be programmably changed;
the width of the partitions is stored on the IC;
the programmable partitionable counter is configured to receive a partition offset size;
the partition offset size varies a first sub-counter size by adding the partition offset size to a nominal partition width; and
the partition offset size varies a second sub-counter size by subtracting the partition offset size from a nominal partition width.

16. The integrated circuit device of claim 15, wherein:
at least two of the plurality of partitioned sub-counters operate separately from each other.

17. The integrated circuit device of claim 15, wherein:
the plurality of partitioned sub-counters has a total fixed quantity of bits.

18. The integrated circuit device of claim 17, wherein:
the fixed quantity of bits is 64 bits.

19. The integrated circuit device of claim 15, wherein:
the partition size of at least one of the plurality of partitioned sub-counters is variable.

20. The integrated circuit device of claim 15, wherein:
at least one of the sub-counters has a partition of 1 bit.

21. The integrated circuit device of claim 15, wherein:
the programmable partitionable counter is configured to receive a partition offset size from a source external to the integrated circuit.

22. The integrated circuit device of claim 15, wherein:
a first account/user has a given partition offset size of a given programmable partitionable counter;
a second account/user has a given partition offset size of a given programmable partitionable counter; and
the partition offset size of the first account/user is different from the partition offset size of the second account/user.

23. The integrated circuit device of claim 15, wherein:
a plurality of different accounts/users has a same partition offset size of a respective given programmable partitionable counter.

* * * * *